United States Patent [19]

Monti

[11] Patent Number: 4,458,275
[45] Date of Patent: Jul. 3, 1984

[54] METHOD AND DEVICE FOR TESTING UNITS FOR PROCESSING MAGNETIC DISKS

[75] Inventor: Alberto Monti, Pavone, Italy

[73] Assignee: Olivetti Tecnost, S.p.A., Ivrea, Italy

[21] Appl. No.: 242,136

[22] Filed: Mar. 9, 1981

[30] Foreign Application Priority Data

Mar. 11, 1980 [IT] Italy ................... 67377 A/80

[51] Int. Cl.$^3$ .................... G11B 21/08; G11B 5/00
[52] U.S. Cl. ................................ 360/78; 360/137
[58] Field of Search .................. 360/25, 31, 39, 53, 360/78, 97, 99, 77, 137, 106, 133, 135

[56] References Cited

U.S. PATENT DOCUMENTS

| | | | |
|---|---|---|---|
| 3,641,278 | 2/1972 | Kinjo et al. | 360/106 |
| 3,646,261 | 2/1972 | Kinjo et al. | 360/106 |
| 3,742,470 | 6/1973 | Ha et al. | 360/77 |
| 4,084,201 | 4/1978 | Hack et al. | 360/77 |
| 4,164,764 | 8/1979 | Joannou | 360/77 |

FOREIGN PATENT DOCUMENTS

| | | | |
|---|---|---|---|
| 2402202 | 8/1974 | Fed. Rep. of Germany | 360/77 |
| 55-62565 | 5/1980 | Japan | 360/77 |

OTHER PUBLICATIONS

IBM Technical Disclosure Bulletin, vol. 17, No. 11, Apr. 1975, Eccentricity Tolerant Head Alignment Check (D. E. Sibbers).
Patents Abstracts of Japan, vol. 4, No. 103, 23 Jul., 1980, p. 151 P 20.

Primary Examiner—Vincent P. Canney
Attorney, Agent, or Firm—Banner, Birch, McKie & Beckett

[57] ABSTRACT

The method of testing units for the processing of magnetic disks comprises the insertion of a suitably modified disk into the testing unit and the reading of this disk when operations controlled by a testing programme are carried out. The disk for testing is modified and has a plurality of concentric tracks recorded on one or both sides in such a way that the distance between two tracks is slightly greater than the distance between the tracks of standard disks. Only the central track coincides exactly with the corresponding central track of standard disks. After the modified disk has been inserted in the testing unit, the magnetic head is firstly positioned on the central track of the disk and then displaced on the tracks moving increasingly further from the central track. Taking into account the occurrence of cross-talk errors caused by the head as a result of the simultaneous interference of two adjacent tracks and the number of sectors of the disk on which the head causes this error, the value of the possible non-alignment of the head in respect of the nominal axis of the tracks and the possible eccentricity of the drive spindle are determined.

8 Claims, 16 Drawing Figures

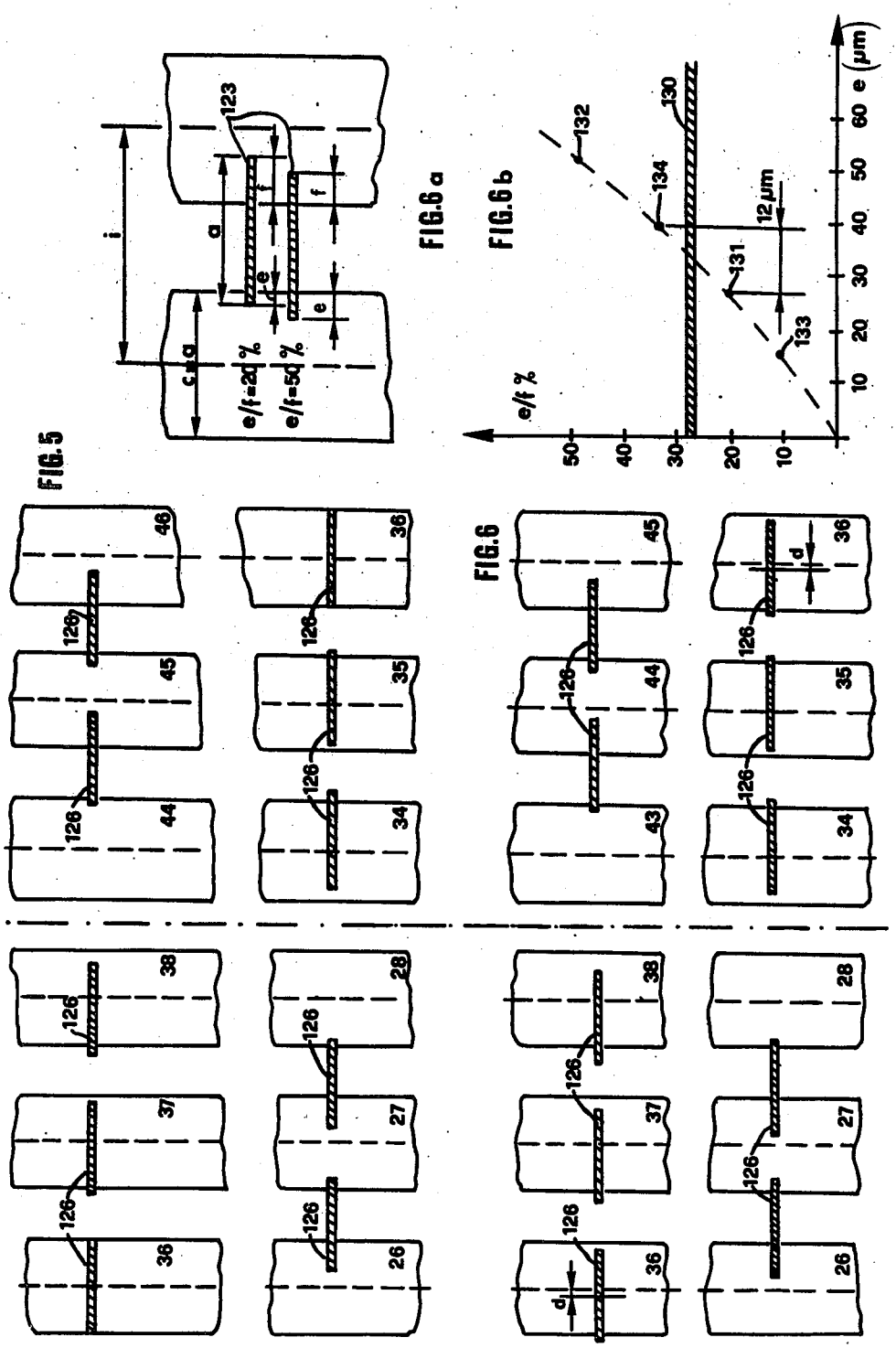

METHOD AND DEVICE FOR TESTING UNITS FOR PROCESSING MAGNETIC DISKS

BACKGROUND OF THE INVENTION

The present invention relates to a method of testing units for processing magnetic disks, for example of the type contained in covering envelopes and known commercially under the name of "floppy disks".

Normal testing of a unit for processing magnetic disks is carried out using a "sample" disk having suitable signals recorded on its tracks, these signals being read by the tested unit. The signals which have been read off are then analysed by means of an oscilloscope in order to enable the determination of the most significant factors. This then enables action to be taken to correct possible errors of the unit being tested. The most widespread errors in the units tested are due to the non-alignment of the magnetic head in respect of the axis of the tracks, the eccentricity of the drive spindle and the incorrect contacting of the disk and the head. Testing with a "sample" disk, although indispensable for a complete detection of the electrical and mechanical parameters of the unit in question, is relatively complex as it requires certain components of the unit to be dismantled in order to provide direct access to the reading head and the use of an oscilloscope and other special measuring instruments. However this may not be readily carrried out in a direct manner by the user.

SUMMARY OF THE INVENTION

The technical problem of the present invention is that of providing a method for testing units which process magnetic disks which, without the use of special equipment, indicates whether the unit is able to function correctly, and provides a response in respect of the alignment of the head and the eccentricity of the drive spindle.

This technical problem is solved by the testing method of the invention, which comprises the use of a modified magnetic disk recorded in such a way that the concentric tracks have a different pitch from that of standard disks and in which a predetermined central track coincides with a corresponding central track of the standard disks so as to accurately detect the adjacent innermost and outermost tracks in which it is certain that a cross-talk error is taking place. This enables the track considered to be central to be determined, as an average between the end tracks detected by the head as a result of exploration of the edged disk. The error of alignment of the head, defined by the distance between the predetermined central track and the calculated track, is determined by the same system to which the unit is connected and displayed as data for the user.

According to a further feature of the invention, the degree of eccentricity of the disk in respect of its theoretical axis is also determined by way of the detection carried out by the system of the percentage of sectors of the disk in which errors are taking place, in respect of the total number of sectors, on the end tracks of the modified disk.

Lastly, monitoring of the coherence of what may be read off theoretically in any conditions of non-alignment and eccentricity and what the system is actually reading off is carried out, the operator being informed of the abnormal condition, when the unit is mechanically or electrically malfunctioning to an overall extent.

These and other characteristic features of the present invention will be explained in the following description of a preferred embodiment, given by way of non-limiting example, with reference to the attached drawings, in which:

BRIEF DESCRIPTION OF THE DRAWING

FIG. 5 is a diagram of certain steps of the testing method of the invention according to a first envisaged operating mode;

FIG. 6 is a diagram of the steps of FIG. 5 according to a second envisaged operating mode;

FIG. 6a is a reading diagram of the disk of FIG. 2;

FIG. 6b is an operating diagram of the unit of FIG. 3;

DESCRIPTION OF THE PREFERRED EMBODIMENT

Figure 1:
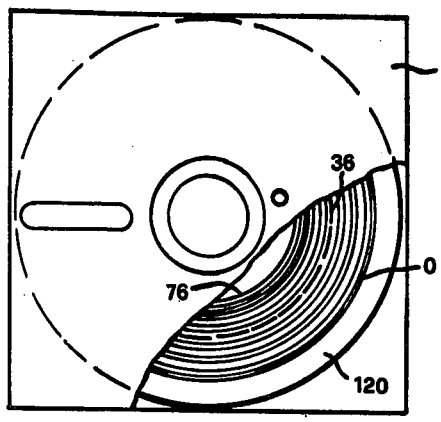
FIG. 1 is a diagrammatic illustration of a flexible magnetic disk of a known type.
Figure 4:
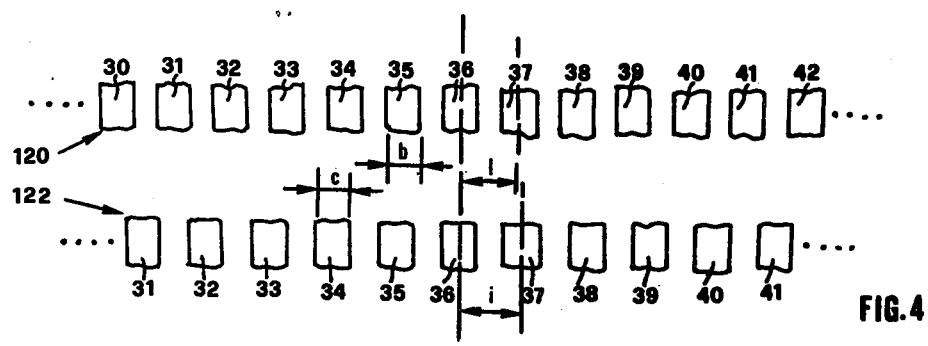
FIG. 4 is a diagram of a portion of the disk of FIG. 1 compared with a portion of the disk of FIG. 2.

The testing method of the invention is applied, for example, to the testing of apparatus for processing flexible magnetic disks of known type, known commercially as "floppy disks". Each of these flexible magnetic disks 120 (FIG. 1) is contained in a covering envelope 121 and, in accordance with a very widespread standard, bears on each side seventy-seven concentric recording tracks normally numbered from 0 (outermost track) to 76 (innermost track). The distance "1" between two adjacent tracks (FIG. 4) is 529 $\mu$m, and the width "b" of each track is 296 $\mu$m, as a result of which the non-recorded zone between two adjacent tracks is 233 $\mu$m. Each disk is in theory divided into 26 sectors such that the data to be recorded is divided, within each track, into 26 blocks.

The units for processing known flexible magnetic disks, called FDU for brevity in the following description, have common electrical and mechanical characteristics, such that the disks processed by these units may be exchanged between several FDUs. In particular each FDU 123 (FIG. 3) comprises a spindle 125 designed to connect with the central hole of the disk to be processed and a recording and/or reading head 126, which is positioned on the tracks of the disk by means of a screw 127 controlled by a step motor 128. The motor 128 and the screw 127 are dimensioned such that the head is displaced exactly by a distance 1=529 $\mu$m, when an elementary displacement is carried out. Two of the most important features for suitable interchangeability are the correct positioning of the recording and/or reading head 126 in respect of the recording tracks of the disk and the absence of eccentricity on the part of the spindle 125 which displaces the disk. In normal conditions, the width of the reading gap of the head 126 (FIG. 5) is 356 $\mu$m, as a result of which a misalignment of ±30 $\mu$m of the head 126 in respect of the track does not have any effect on the amplitude of the signal read off. However, since the mechanical tolerances due to the eccentricity of the spindle 125, the pitch of the screw 127, the position of the step motor 128 and the mounting of the head 126 may lead to maximum misalignments of approximately ±70 μm, of the position of the head 126 in respect of the nominal axis of the tracks, a signal which is read off and reduced by 36% in respect of the written signal is accepted as suitable. Greater misalignments mean that an FDU which reads a correctly recorded disk, does not recognise the signals contained in the disk as good. If an individual FDU having an incorrect alignment of the head records disks, it will detect as good those disks which it has recorded itself, and will detect as defective those disks recorded by units having correctly positioned heads, whilst the defective disks will be detected as such by a correctly adjusted FDU. In addition, as the defective disks may be defective as a result of specific features of the disk and not of the unit which has recorded them, it is very advantageous for the user to be able, directly and without the use of special apparatus such as oscilloscopes or testers, to establish whether it is the FDU which is incorrect or whether the disks have specific defects.

Figure 2:
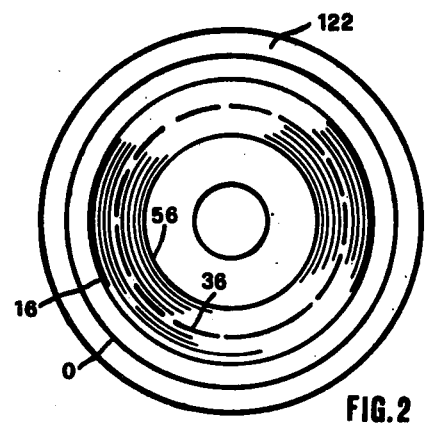
FIG. 2 is a diagrammatic illustration of a flexible magnetic disk in accordance with the method of testing of the invention.
Figure 7:
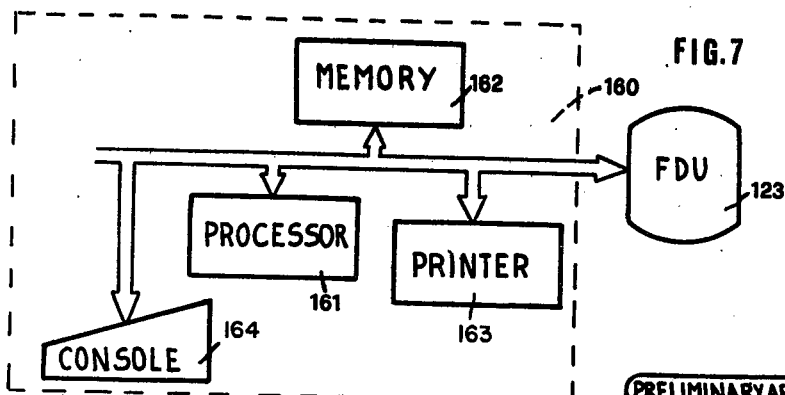
FIG. 7 is a block diagram of the system to which the processing unit of FIG. 3 may be connected.

The FDU testing method of the invention comprises the use of a flexible disk 122 (FIG. 2) having the same physical features as known flexible disks, but which is suitable modified, as will be explained in more detail in the following description. The disk 122 is designed to be introduced into a FDU 123 (FIG. 7) to be monitored or tested, connected to a system 160 which may be given in block diagram form with a processor 161, a memory 162, a printer 163 and a control console 164. The disk 122 is processed in accordance with a suitable programme which may be carried out by the system in any known way, even by way of the FDU 123 itself, or which, in larger systems, may be part of the diagnostic programme of the system, as will be explained in the following description in more detail.

The disc 122 (FIG. 4) is modified by recording, on one or both of its sides, forty-one concentric tracks which are equally spaced from one another by a width "c" of 356 μm instead of 296 μm, such that the distance "i" between two adjacent tracks is 25 μm greater than that used in the initialisation standard, i.e. 554 μm instead of 529 μm. In addition, the forty-one concentric tracks of the modified disk 122 are recorded such that a predetermined track, indicated by 36 for reasons of simplicity, corresponds exactly to the track 36 of the disk 120 of standard format. On the disk 122, the tracks having higher and lower numbers than the track 36 are progressively staggered by +25 μm, +50 μm, +75 μm etc. and −25 μm, −50 μm, −75 μm etc. respectively, in respect of the corresponding tracks of the disc 120 of standard format. In addition, a track 0 is also registered on the disk 122, and corresponds exactly to the track 0 of the disc 120 of standard format, and is therefore the outermost of the tracks.

Figure 3:
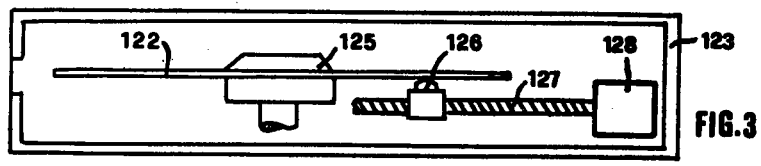
FIG. 3 is a diagrammatic illustration of a unit for processing flexible magnetic disks.

The disk 122 is recorded by an FDU of the above-described type illustrated in FIG. 3, but executed, in particular in respect of the tolerances of the feed screw 127, the head 126 and the positioning of the step motor 128, to an order of magnitude which is lower than the maximum admissible values for standard FDUs. The gap between the head and the pitches of the screw 127 and the motor 128 then ensure a track of 356 μm and a pitch of 554 μm instead of the standard values 296 μm and 529 μm.

The testing method of the invention comprises the introduction of the modified disk 122 into the FDU 123 to be tested (FIG. 3) and then a series of steps controlled by the programme introduced into the apparatus.

This programme comprises the positioning of the head 126 on the central track 36 of the disk 122 and the successive reading of the other inner tracks in the first instance, and then the outer tracks. This takes place such that, by moving progressively further away from track 36 in both directions, the head 126 is in increasingly marginal conditions in respect of the track to which it has been addressed. It is certain that there are two end tracks beyond which the head 126 is no longer capable of reading the content of the tracks correctly. Beyond these tracks, the interference of the adjacent track on the address track of the head causes a cross-talk error (FIGS. 5 and 6) which is detected by the system.

On the head 126 (FIG. 6a), which is reading a modified disk 122, the cross-talk error is given by the relationship e/f, in which "e" is proportional to the interference read from the adjacent track, and "f"=(158−e) is proportional to the signal to be read.

In the case of the FDU 123, the track may still be read when e/f=28%; the transition zone 130 (FIG. 6b) is very restricted as a result of which minimal displacements of the head in respect of the track suffice to cause transition from the correct reading condition to the condition in which error is generated. The geometric amounts according to which the edging has been calculated, i.e. intertrack 554 μm, track width 356 μm and pitch variation 25 μm, ensure that the transition zone will be passed as a result of a displacement of the head of 12 μm. This value represents the sensitivity of the method having a theoretical accuracy of ±6 μm.

The geometric situation under which a head 126 (FIG. 5) operates when aligned on the standard tracks is described by way of example in comparison with the conditions which occur with a head which is 12.5 μm out of alignment (FIG. 6).

In the first case, the head 126 (FIG. 5) of the unit 123 in question is within its nominal amount, and is correctly aligned in addition with the track of the modified disk which corresponds to the track 36 of standard format and the end track is reached after nine steps of the head 126, both towards the interior and towards the exterior of the disk, with a cross-talk error of approximately 20% (point 131 of FIG. 6b). At the tenth step, track 46 and 26, the cross-talk interference due to the tracks 45 and 27 is approximately 50% (point 132 of FIG. 6b) and the track may no longer be read. In this case, and only in this case, the two end tracks are symmetrical with respect to the central track 36. If however the head 126 is out of alignment, the two end tracks are not equidistant from the track 36, but symmetrical with a new amount corresponding the value and the sign of the misalignment of the head 126. The misalignment "d", expressed in μm, is given by the formula:

$$d = (ti - te) \cdot \Delta 12,$$

in which ti is the number of inner tracks read before the end track, te is the number of outer tracks read before the end track and Δ is the difference of pitch, in this case 25 μm.

In the case in which the head 126 (FIG. 6) is outwardly misaligned by 12.5 μm, after 8 inward steps from the track 36, the head reaches track 44, which is the end track, with a cross-talk interference of 10% (point 133 of FIG. 6b). After a further step, the head 126 is in effect between the tracks 44 and 45 and the cross-talk error, of approximately 33%, makes reading of the track impossible (point 134 of FIG. 6b). From track 36, the head is then displaced outwardly; after nine steps it reaches the end track 37 with interference of 10% (point 133 of FIG. 6b) and on track 28 detects a cross-talk error of 33% (point 133 of FIG. 6b). The deviation of the head $d=(8-9)\times25/2 = -12.5$ μm, in which the negative sign indicates that it is directed towards the exterior of the disk in respect of the track 36.

If the head 126 is misaligned by ±25 μm, the same geometric conditions as for the case of alignment are repeated with the same cross-talk errors, but on the end tracks 44 and 26; and 46 and 28 for misalignments of the head 123 towards the interior and towards the exterior of the disk respectively. In general, for different misalignments "d", the number of steps "N" required to reach the end track is given by the following table:

| d | d | 0 | 12.5 | 25 | 37.5 | 50 | 62.5 | 75 | 87.5 |
|---|---|---|------|----|------|----|------|----|------|
| N | − | 9-9 | 8-9 | 8-10 | 7-10 | 7-11 | 6-11 | 6-12 | 5-12 |
|   | + |     | 9-8 | 10-8 | 10-7 | 11-7 | 11-6 | 12-6 | 12-5 |

Under normal conditions, the sum n of the two directions of the steps is 17 or 18 tracks and is not dependent on the misalignment of the head 126. If however, as a result of other defects, the unit is unable to read the marginal tracks the sum n will be lower than 17. The testing programme provides an "Abort" signal when the sum of the tracks is = 15, conceding a marginal track to take into account the inaccuracies which may be supported by the FDU 123. The "Abort" condition indicates that the unit is not functioning corrently for a series of reasons; which reasons may depend on a bad contact or an error of azimuth in respect of the head, defects in the reading amplifier, fluctuations in the speed of the disk (jitter) and other positioning errors due to the motor, or to a non-radial head movement.

If the spindle 125 (FIG. 3) of the FDU 123 which is being tested is eccentric, the cross-talk condition may only occur in some sectors of the track; in this case, when the head is directed to the subsequent track, the cross-talk error will take place on a greater number of sectors, or even on all the sectors, as a function of the extent of the eccentricity, as will be explained below.

The method disclosed may also be applied to units with rigid disks or drums and, with suitable modifications, also to units for processing magnetic supports in which one or more heads pass through a spiral in respect of the disk. In addition, the geometrical amounts relating to the modification may be different, as a function of the interference-signal ratio which determines the cross-talk error, the width of the gap of the head, the number of tracks, their packing and the number of sectors or blocks into which the various tracks are subdivided.

Figure 8:
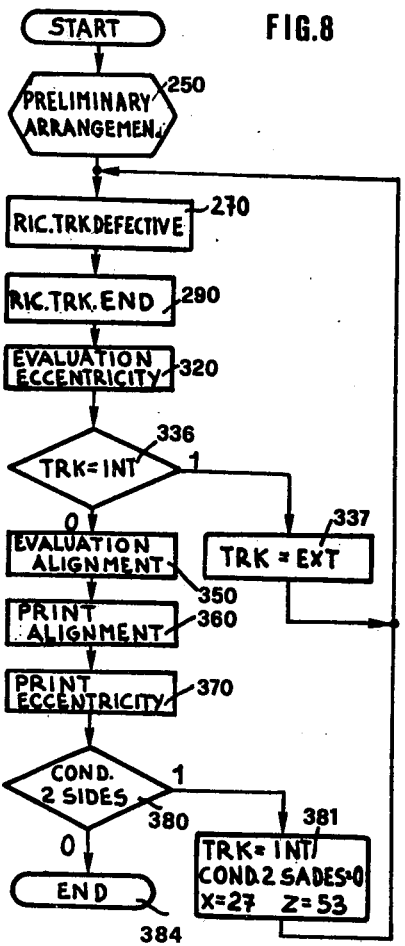
FIG. 8 is a general flow diagram of the testing method of the invention.

With reference to FIG. 8, the control programme of the method comprises initial preliminary steps 250 of the system 160, a step 270 for detecting the defective track (TRK), a step 290 for detecting the internal end track, an evaluation 320 of the eccentricity of the disk, detection via 336 and 337 of the external end track, an evaluation 350 of alignment, printing of the results at 360 and 370 and, by means of 380 and 381, testing of the other side of the disk, if this may be carried out by the system.

Figure 9:
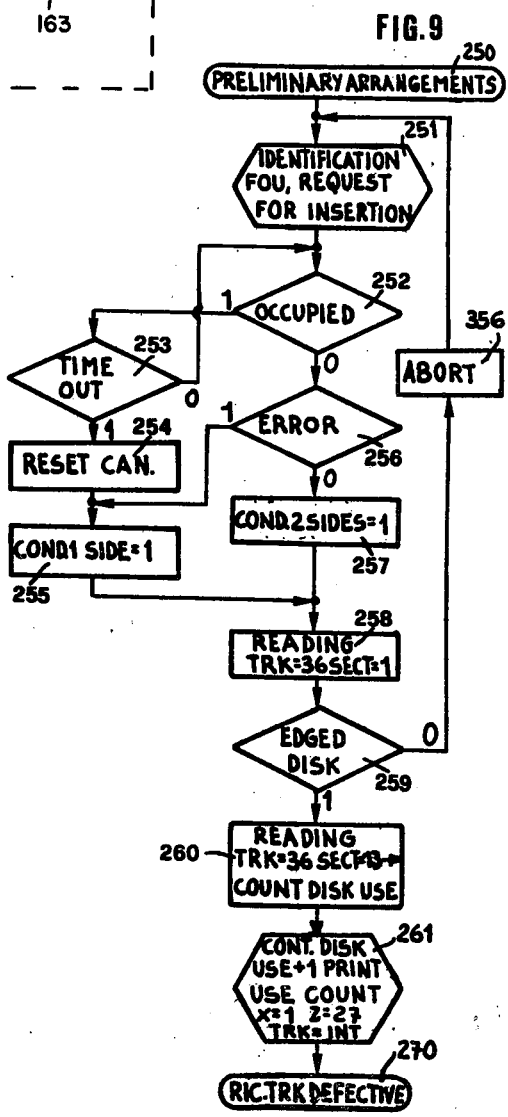
FIGS. 9–14 are flow diagrams of various steps of the flow diagram of FIG. 8.

The preliminary steps 250 (FIG. 9) provide at 251 an identification of the FDU under test, and a request for introduction of the edged disk, Once this is carried out, the programme moves the head onto TRK=0 in order to read the double side condition on sector seven (SEKT=7). If this is not provided, the programme stores the single side condition (COND 1 SIDE=1) at 255 by way of 252 (OCCUPIED=1), after recycling at 253 and reset at 254. In the positive case, by means of the junction 256, the double side condition is stored at 257 (COND 2 SIDES=1). The programme then positions at 258 the head 126 on the track 36 in order to read sector 1, in which the edged disk condition is recorded. If this is true at 259 the programme continues with the reading at 260 of sector 13 in which the times at which the disk has been read are recorded. This datum is stored, increased by 1 at 261 and printed. In addition the following are stored; the starting sector X=1, and the finishing sector Z=26, which are typical of side 1 of the disk and the internal track detection condition TRK=INT.

Figure 10:
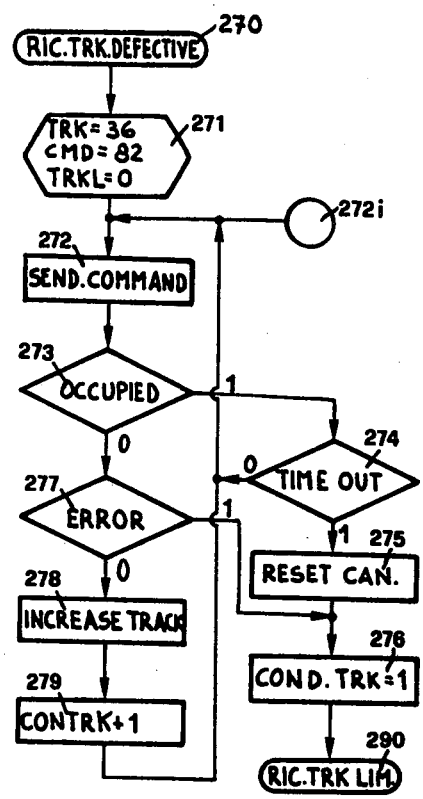

During detection 270 of the defective track (FIG. 10), at 271 the head is positioned on track 36 (TRK=36), rapid reading of the tracks without transfer into the memory (CMD=82) is set, and the end track condition is reset to zero (TRKL=0). The reading command is then sent at 272. If reading is not possible as a result of an occupied channel, junction 273, after a sequence of attempts (TIME OUT 274) (RESET CAN 275) the programme continues, setting at 276 a 1 condition for the defective track (COND 1 TRK=1), to the detection of the end track (RIC TRK LIM) at 290.

Figure 11:
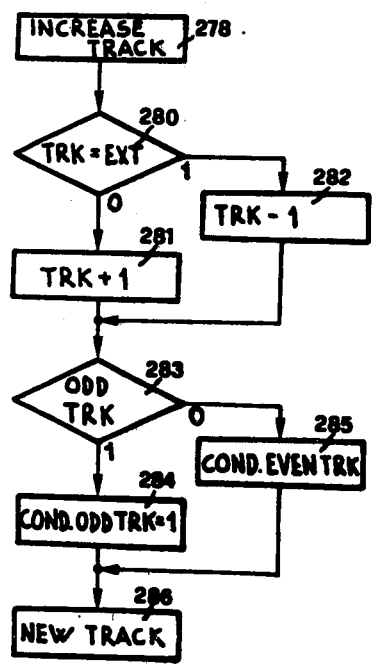

If the channel is not occupied, the existence of an error is checked in the various sectors at 277. If none are found, the other tracks are examined by means of the sub-routine 278, with an increase in the track counter (CONTRK+1) at 279. When the error is found at the junction 277, the programme sets COND 1 TRK=1 and continues with the routine RIC TRK LIMIT 290. The sub-routine 278 (FIG. 11) increases or decreases, via the junction 280, the number of tracks at 281 or 282, if the internal track TRK≠EXT or external track TRK=EXT is found and subsequently the junction 283 sets the unequal or equal track condition at 284 and 285 and the indication for a new track at 286.

In the routine 290 (FIG. 12), the defect counters TOT.ERR and SECT. ERR are set to zero at 291 and SECT=X and CMD=CO are set, the latter indicating a command with data transfer. At 292 a reading command is then sent which, if it is not carried out in time, by means of 293, 294 and 295 causes at 296 an increase of the error counters TOT.ERR and SECT.ERR. If the reading is executed, checking takes place at 298 for errors; in the positive case this is counted at 296, whilst in the negative case checking is also carried out at 299, 300, 301 and 302 as to whether the data actually read off are in fact those relevant to the parity of the track which is being read. In defective cases, as may happen in the case of errors of eccentricity on part of the sectors, the data read off are erroneous and cause an increase of TOT.ERR and SECT. ERR at 296. A further correction takes place at 303, by considering the sector lying between two adjacent erroneous sectors to be statistically erroneous; this is taken into account by increasing TOT.ERR by 1 at 304. If there are no errors the other sectors are examined at 305 and 306 and the other tracks at 278, 279 via the point 272 i of FIG. 10, considering the tracks with less then 2 errors to be correct at 307. At 308 it is then ascertained whether the number of defective sectors is greater than 13. If this is not the case, the errors are due to eccentricity, evaluated at 320. However errors in the majority of sectors indicate the presence of the track past the end track. If the related register TRKL (junction 309) is already at 1, the eccentricity is evaluated at 320, otherwise TRKL=1 is set at 310 and the evaluation of the alignment is continued at 350.

In the routine 320 (FIG. 13), it is ascertained at 321 whether the errors at SECT. ERR are greater than 20. This is an index of slight eccentricity statistically approximate to 5 μm. This value is stored (VALECC=5) at 323. Another track is then read at 278 and return to 290 is carried out. If the errors are less than 20, examination of up to four adjacent tracks is carried out, by means of 321 to 335, 278 and 290, storing the relative statistical values of eccentricity at VALECC. These are 10 or 20 μm for track 2 or 3, or 30 or 40 μm if correct sectors cannot be read in track 4 or if no sectors can be read, which indicates a non-tolerable eccentricity.

Figure 12:
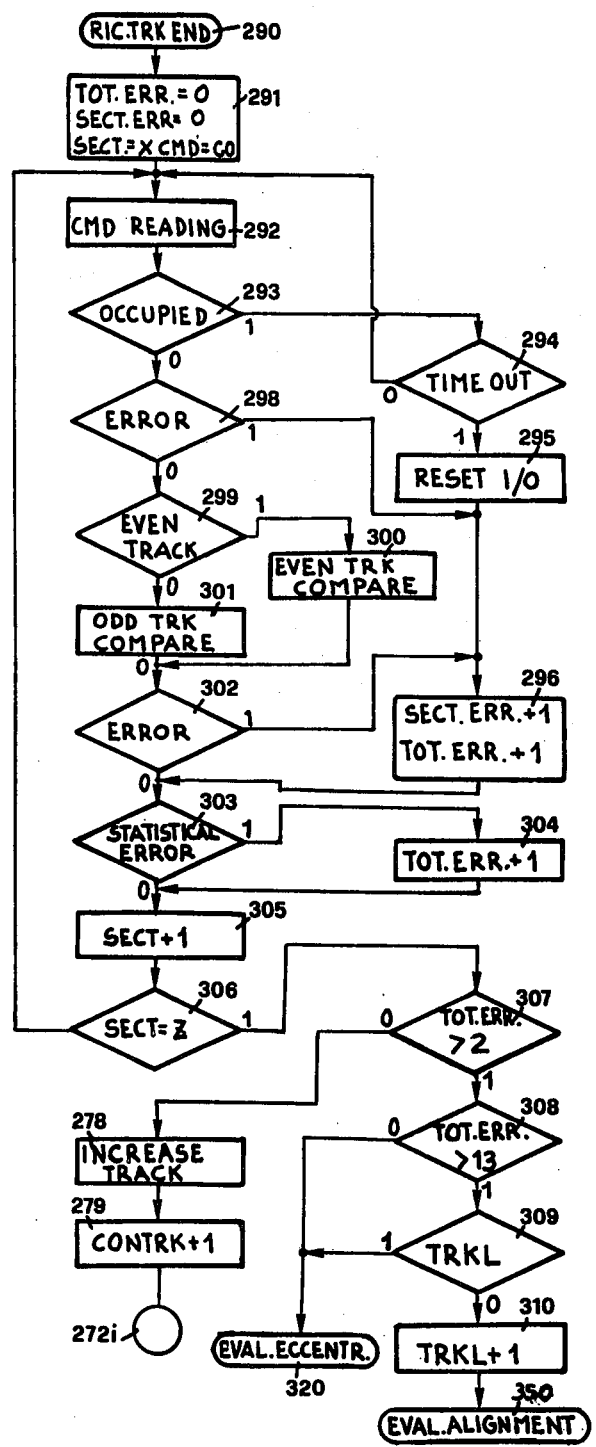
Figure 13:
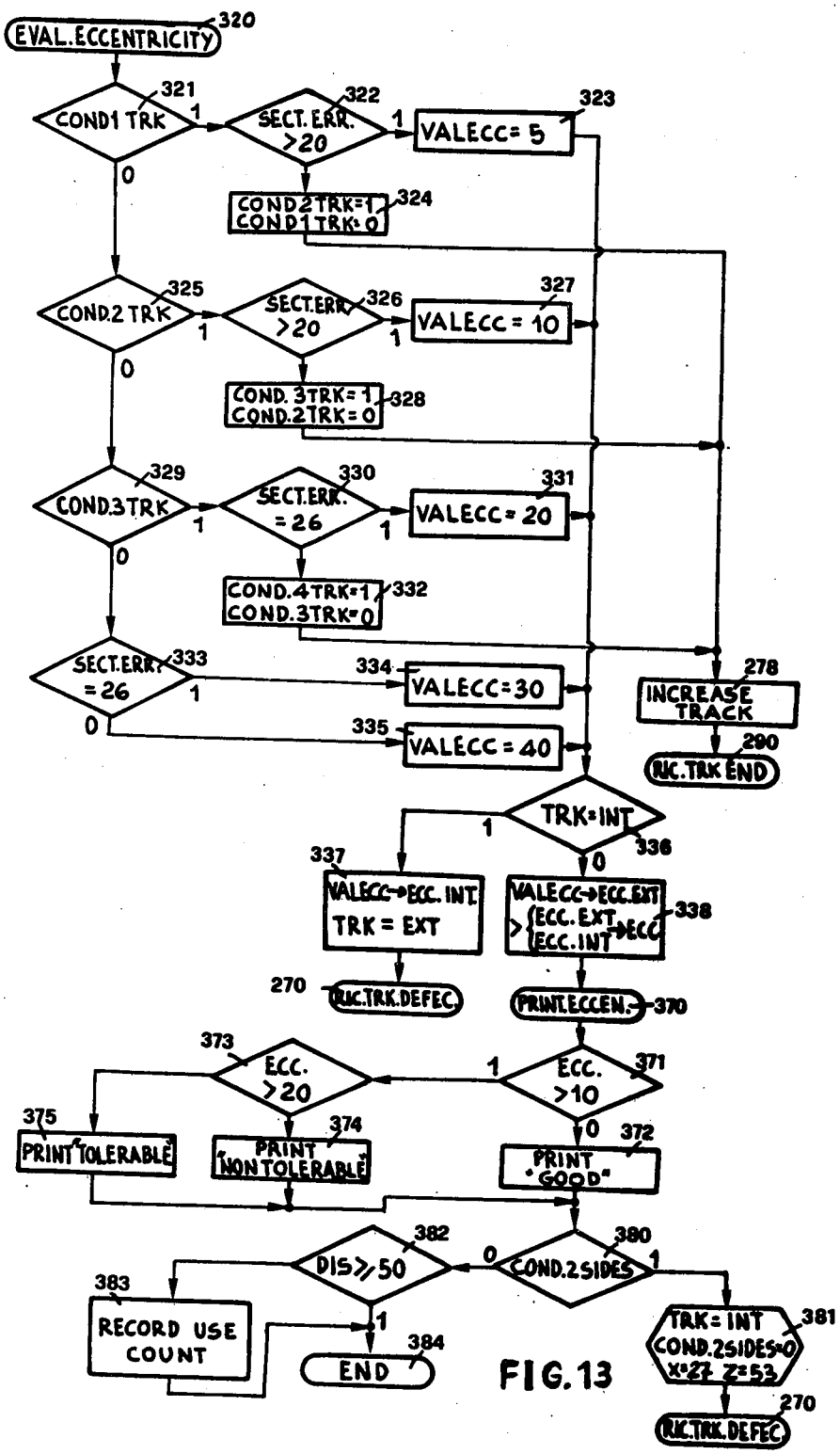
Figure 14:
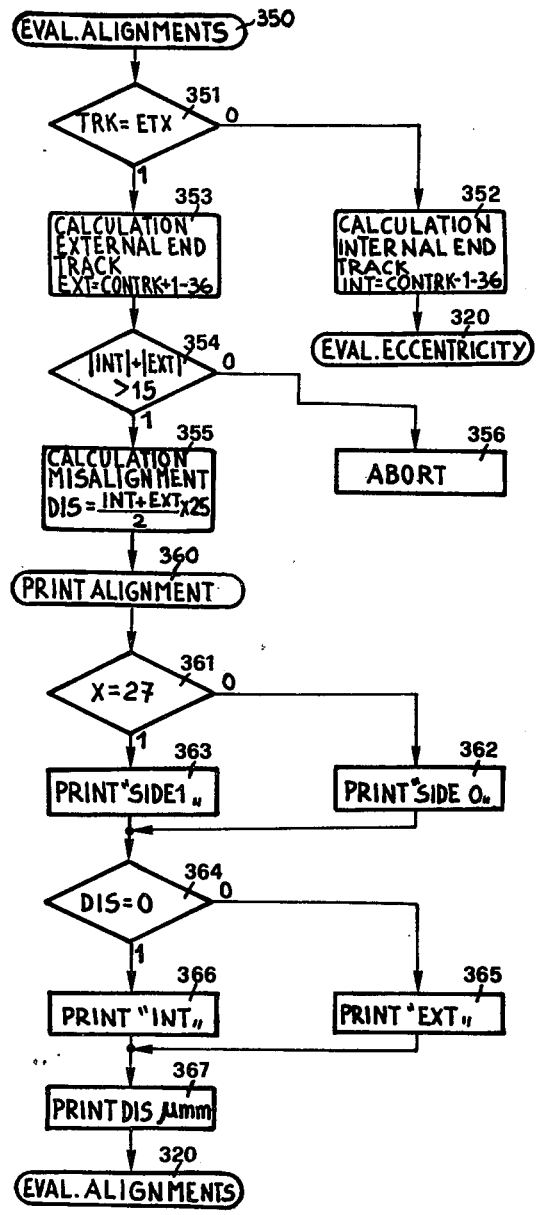

When the routine 320 of FIG. 13 is reached from the junction 308 (FIG. 12), the sub-routine 278 moves to a track which, even if it does not have more than 20 errors, has more then 13 which leads, by means of 308, 309 and 310 to the routine of evaluation of the alignment 350 (FIG. 14). The first time that this occurs, having ascertained at 351 that TRK≠EXT, the internal end track INT is calculated at 352, as the difference minus 1 of the track counter CONTRK value and the value 36 of the central track and the routine 320 is returned to (FIG. 13). At the junction 336, the programme continues at 337, storing VALECC (internal) in ECC INT and TRK=EXT, in order to examine the external tracks and the return to the detection of the defective track at 270 (FIG. 10) and the end track at 290 (FIG. 12).

In this further examination, the external eccentricity and the alignment are evaluated. In particular at 353 (FIG. 14) the external end track is calculated as the difference +1 of the value of the track counter CONTRK and the value 36. If at 354 the readable tracks are not more than 15, the programme prints ABORT at 356, indicating errors in the FDU which cannot be repaired by simple adjustments. In the positive case, it calculates at 355 the misalignment d in accordance with the formula d=(INT+EXT):2×25 which, from 360, is printed by 164 (FIG. 7) with the data "Side 0" or "Side 1" and "INT" or "EXT" indicating the side read and the misalignment, according to the blocks 361 to 366, and then returning to the routine 320 of FIG. 13. The programme then moves from the junction 336 to the block 338 where VALECC (external) is stored in ECC EXT, and the greater value is chosen from ECC INT and ECC EXT and stored in ECC. The programme then moves from the print 370 to the blocks 371–375 where, according to whether ECC=10, =20 or 20, causes the printer 164 to print the data "Good", "Tolerable" or "Non-tolerable" in accordance with the eccentricity values detected, and then continues with the examination of the second side, at 381, 270. Finally, if the values of misalignment are tolerable (within 50 μm), it records on the edged disk value of the use counter, previously increased and stored, thus completing testing at 384.

On the basis of the measured values, the operator has all the data required to act upon the FDU (for example adjustment of the alignment of the head on the carriage) or to request repair of the unit which may not be repaired with the means available to him.

What I claim is:

1. A method of testing units which process standard magnetic disks, wherein a modified disk (122) is inserted into the unit (123) to be tested and the magnetic head (126) of the unit is positioned on a base track (36) in the central region of the recording area (0 to 56), characterized in that (a) the modified disk (122) is recorded in such a way that its tracks (31 to 41) have a different pitch from that (30 to 42) of standard disks (120) and has the base track (36) so arranged that it is coincident with a predetermined track of the standard tracks; that (b) after positioning the magnetic head (126) of the unit (123) to be tested on this base track (36) the magnetic head (126) is incrementally displaced towards the innermost and the outermost tracks of the modified disk (122) until two end tracks have been reached, one internal and one external, beyond which the head (126) causes cross-talk errors; and that (c) the misalignment of the head (126) is calculated in respect of the axis of the tracks as the distance between the base track (36) and a hypothetical middle track centered between the internal end track and the external end track.

2. Method according to claim 1, in particular for disks with concentric tracks, wherein said end track is detected as the track previous to that in which more than half of the data contained in the track are erroneous.

3. Method according to claim 1, further comprising a step for detecting the errors from the tracks subsequent to the end track in order to evaluate, by statistical means, the degree of eccentricity of the unit to be tested.

4. A method as claimed in claim 1, characterized in that the misalignment (d) is calculated as the difference between the average of the number of tracks read inwardly (ti) and the number of tracks read outwardly (te) up to the respective end tracks from the base track, multiplied by half the difference (Δ) in pitch between the standard disk (120) and the modified disk (122).

5. Method according to claim 4, further comprising the step of monitoring a minimum number of tracks which are readable between the end tracks in order to detect other types of error in the unit being tested.

6. Method according to claims 5, wherein said testing units process flexible magnetic disks.

7. A device for testing units which process standard magnetic disks having a plurality of concentric recording tracks thereon, and wherein each one of said units comprises drive means for rotating a magnetic disk, a magnetic head for reading and/or writing information on the tracks of the rotating disk up to a predetermined misalignment of the head with respect to said tracks, and means for moving said head with a predetermined standard pitch radially with respect to said concentric recording tracks and arresting the head on each of said tracks for reading and/or writing said information, said device comprising a modified magnetic disk whereon a plurality of concentric testing tracks are recorded with a pitch and insertable into the unit to be tested for causing a base track of said testing tracks to be substantially aligned conincident with a predetermined position of said magnetic head, control means causing said moving means to position said head on said base track and to displace said head towards the innermost and the outermost testing tracks until two end tracks have been reached, one internal and one external, beyond which said head causes cross-talk errors, and means calculating the misalignment of said head with respect to the axis of said testing tracks as the distance between said base track and an average hypothetical track centered between the internal end track and the external end track in order to evaluate the alignment errors of the head with respect to the drive means of the tested unit.

8. A device according to claim 7, wherein the information on said tracks are divided into sectors and said device comprises means for counting the number of sectors on tracks beyond the end tracks of said testing magnetic disk wherein cross-talk errors have been revealed and for determining eccentricity errors of the drive means of the tested unit.

* * * * *